United States Patent
Koh

(10) Patent No.: US 6,169,711 B1
(45) Date of Patent: Jan. 2, 2001

(54) TECHNIQUE FOR CONTROLLING MOTION OF DISK TRAY AND PICKUP

(75) Inventor: Young-ok Koh, Suwon (KR)

(73) Assignee: SamSung Electronics Co., Ltd., Suwon (KR)

( * ) Notice: Under 35 U.S.C. 154(b), the term of this patent shall be extended for 0 days.

(21) Appl. No.: 09/124,526

(22) Filed: Jul. 29, 1998

(30) Foreign Application Priority Data

Jul. 29, 1997 (KR) .................................................. 97-35782

(51) Int. Cl.$^7$ .................................................. G11B 17/22
(52) U.S. Cl. .............................................. 369/33; 369/75.2
(58) Field of Search ........................... 369/33, 75.2, 75.1, 369/77.2, 77.1, 36, 37, 38, 39, 32

(56) References Cited

U.S. PATENT DOCUMENTS

| | | |
|---|---|---|
| 4,701,901 * | 10/1987 | Imai ..................................... 369/75.2 |
| 5,119,357 * | 6/1992 | Tsuruta et al. ....................... 369/75.2 |
| 5,237,551 | 8/1993 | Ogawa et al. . |
| 5,253,235 | 10/1993 | Isobe et al. . |
| 5,386,403 | 1/1995 | Morioka et al. . |
| 5,434,839 | 7/1995 | Choi . |
| 5,467,333 | 11/1995 | Ji . |
| 5,500,844 | 3/1996 | Kim et al. . |
| 5,504,729 | 4/1996 | Ikedo et al. . |
| 5,563,857 | 10/1996 | Park . |
| 5,563,865 * | 10/1996 | Wheeler .............................. 369/77.1 |
| 5,572,497 | 11/1996 | Kim et al. . |
| 5,633,850 | 5/1997 | Park . |
| 5,636,198 | 6/1997 | Maeng . |
| 5,673,244 | 9/1997 | Choi . |
| 5,708,643 | 1/1998 | Choi et al. . |
| 5,768,240 | 6/1998 | Hiraga . |
| 5,774,442 | 6/1998 | Nakamichi . |
| 5,892,737 * | 4/1999 | Park ..................................... 369/33 |
| 5,903,527 * | 5/1999 | Park ..................................... 369/33 |
| 5,903,538 * | 5/1999 | Fujita et al. ......................... 369/178 |
| 6,005,831 * | 12/1999 | Park ..................................... 369/37 |

FOREIGN PATENT DOCUMENTS

| | | |
|---|---|---|
| 61-203463 | 12/1986 | (JP) . |
| 8-279221 | 10/1996 | (JP) . |
| 9-91820 | 4/1997 | (JP) . |
| 10-112106 | 4/1998 | (JP) . |
| 97-17379A | 4/1997 | (KR) . |

* cited by examiner

*Primary Examiner*—Tan Dinh
(74) *Attorney, Agent, or Firm*—Robert E. Bushnell, Esq.

(57) ABSTRACT

A technique for controlling the motion of a disk tray in which the movement of a pickup and the loading/ejection of the disk tray is performed using a single motor. A disk tray position sensor includes at least one switch turned on or off according to the position of the disk tray and senses the position of the disk tray to output a logic value combination according to the position. A controller generates a motor control signal according to the logic value combination from the disk tray position sensor and an external input command. A motor moves a pickup or the disk tray according to the motor control signal. A combining unit selectively transmits motor power to the pickup or the disk tray according to the rotation direction and rotation amount of the motor.

11 Claims, 6 Drawing Sheets

| MODE \ SWITCH | SWITCH A | SWITCH B |
|---|---|---|
| TRAY OPEN | OFF | ON |
| TRAY MOVES HORIZONTALLY | OFF | OFF |
| TRAY MOVES VERTICALLY | ON | OFF |
| TRAY IS LOADED | ON | ON |

| MODE \ SWITCH | SWITCH A | SWITCH B |
|---|---|---|
| TRAY OPEN | OFF | ON |
| TRAY MOVES HORIZONTALLY | OFF | OFF |
| TRAY MOVES VERTICALLY | ON | OFF |
| TRAY IS LOADED | ON | ON |

TECHNIQUE FOR CONTROLLING MOTION OF DISK TRAY AND PICKUP

CROSS REFERENCE TO RELATED APPLICATIONS

The present application is related to the co-pending U.S. patent application Ser. No. 08/995,279, entitled "LOADING DEVICE IN DISK PLAYER", filed on Dec. 19, 1997, by Son et al. The related application is assigned to Samsung Electronics Co., Ltd., the same assignee as that of the present application.

CLAIM OF PRIORITY

This application makes reference to, incorporates the same herein, and claims all benefits accruing under 35 U.S.C. § 119 from an application for APPARATUS FOR CONTROLLING MOTION OF DISK TRAY AND PICKUP AND METHOD THEREFOR earlier filed in the Korean Industrial Property Office on Jul. 29, 1997 and there duly assigned Ser. No. 35782/1997.

BACKGROUND OF THE INVENTION

1. Field of the Invention

The present invention relates to an optical disk drive, and more particularly, to a technique for controlling the motion of a pickup and a disk tray of the optical disk drive.

2. Description of the Related Art

In general, the disk tray of a optical disk drive is installed such that the disk tray is able to be moved in and out in order to load a disk. Data is either recorded on the disk or reproduced therefrom into a deck in the disk drive. The disk tray carries the disk by being loaded into or ejected from the deck of the disk drive. Also, a pickup for reading information from the disk is installed in the disk drive such that the pickup can be moved radially on the disk.

In earlier apparatus for controlling the transfer of the disk tray of a disk drive, motors for transferring the disk tray and the pickup are separately installed, along with integrated circuit chips for controlling the motors. Accordingly, there are numerous parts in the disk drive, which increases the manufacturing cost of the disk drive.

The patents to Kim et al., Park, and Maeng, U.S. Pat. Nos. 5,572,497, 5,633,850, and 5,636,198, respectively entitled Single Motor Driving Device For A Mini-Disc Player, Optical Disc Player Having An Apparatus For Transferring Both A Disc Tray And An Optical Pickup, and Multi-Compact Disk Player, each discloses disk players utilizing a single motor for driving both the disk tray and a pickup. However, none of these three patents teaches or suggests the specifically recited technique for controlling the motion of a disk tray and pickup in accordance with the present invention.

The following additional patents each discloses features in common with the present invention but are not as pertinent as the patents discussed in detail above: U.S. Pat. No. 5,237,551 to Ogawa et al., entitled Apparatus Measuring An Output Of A Disk Drive, U.S. Pat. No. 5,253,235 to Isobe et al., entitled Disk Player Wherein A Plurality Of Compact Disks And A Laser Disk Are Rotated With A Single Motor, U.S. Pat. No. 5,386,403 to Morioka et al., entitled Single Motor Disk Loading Device With Lock Gear, U.S. Pat. No. 5,434,839 to Choi, entitled Disc Loading Apparatus For An Optical Disc Player Using A Single Motor For Horizontal And Vertical Movement Of The Disc Tray, U.S. Pat. No. 5,467,333 to Ji, entitled Tray And Disc Driving Mechanism For Laser Disc Player, U.S. Pat. No. 5,500,844 to Kim et al., entitled Device For Driving Minidisk Player, U.S. Pat. No. 5,504,729 to Ikedo et al., entitled Multi-Tray Disk Player With Selective Tray Latching, U.S. Pat. No. 5,563,857 to park, entitled Disc Changer Having A Single Driving Motor For Both A Tray And A Roulette, U.S. Pat. No. 5,673,244 to Choi, entitled Disk Loading And Magnetic Head Lifting Mechanism Using A Single Power Source For A Minidisk Player, U.S. Pat. No. 5,708,643 to Choi et al., entitled Multiple Focus Optical Pickup System For Alternatively Reading A Multiple Number Of Optical Disks, U.S. Pat. No. 5,768,240 to Hiraga, entitled Optical Disk Recording/Reproducing Apparatus, and U.S. Pat. No. 5,774,442 to Nakamichi, entitled Disk Transferring Device With A Single Motor For Moving A Disk Along First And Second Disk Guides From A First Position To A Second Position And For Separating The Disk Guides When The Disk Is In The Second Position.

SUMMARY OF THE INVENTION

To solve the above problem, one object of the present invention is to provide an apparatus for controlling the motion of a pickup and a disk tray of a optical disk drive using a single motor.

Another object of the present invention is to provide a method of controlling the motion of a pickup and a disk tray of a optical disk drive using a single motor.

In a disk tray transfer control apparatus to achieve one of the above objects, a disk tray position sensor comprises at least one switch which is turned on or off according to the position of the disk tray and which senses the position of the disk tray to output a logic value combination according to the position. A controller generates a motor control signal according to the logic value combination from the disk tray position sensor and an external input command. A motor moves a pickup or the disk tray according to the motor control signal. A combining unit selectively transmits the power of the motor to the pickup or the disk tray according to the rotation direction and rotation amount of the motor.

In order to achieve another one of the above objects, there is provided a disk tray transfer control method of a disk drive for moving a pickup and a disk tray by a single motor. First, a state mode is determined according to a logic value combination representing the position of the disk tray. Then, it is determined whether a disk tray loading/unloading command has been input. When the disk tray loading/unloading command has been input, the disk tray loading/unloading command is regarded as an unloading command if a current mode is the loading completion mode and as a loading command if the current mode is the open completion mode. The tray is moved in accordance with a driving voltage according to a predetermined timing chart while sensing the position of the disk tray.

BRIEF DESCRIPTION OF THE DRAWINGS

The above objective(s) and advantage(s) of the present invention will become more apparent by describing in detail a preferred embodiment thereof with reference to the attached drawings in which.

DESCRIPTION OF THE PREFERRED EMBODIMENTS

Figures 1, 2:
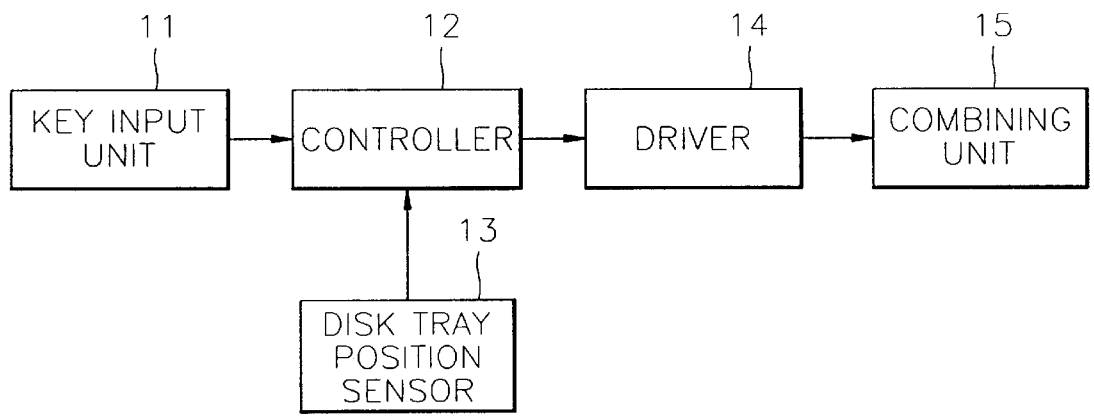
FIG. 1 shows the structure of an apparatus for controlling the motion of a disk tray according to the present invention.
FIG. 2 is a switch logic table showing modes according to the positions of a disk tray.

Referring to FIG. 1, an apparatus for controlling the motion of a disk tray according to the present invention includes a key input unit 11, a controller 12, a disk tray position sensor 13, a driver 14, and a combining unit 15.

Figure 4:
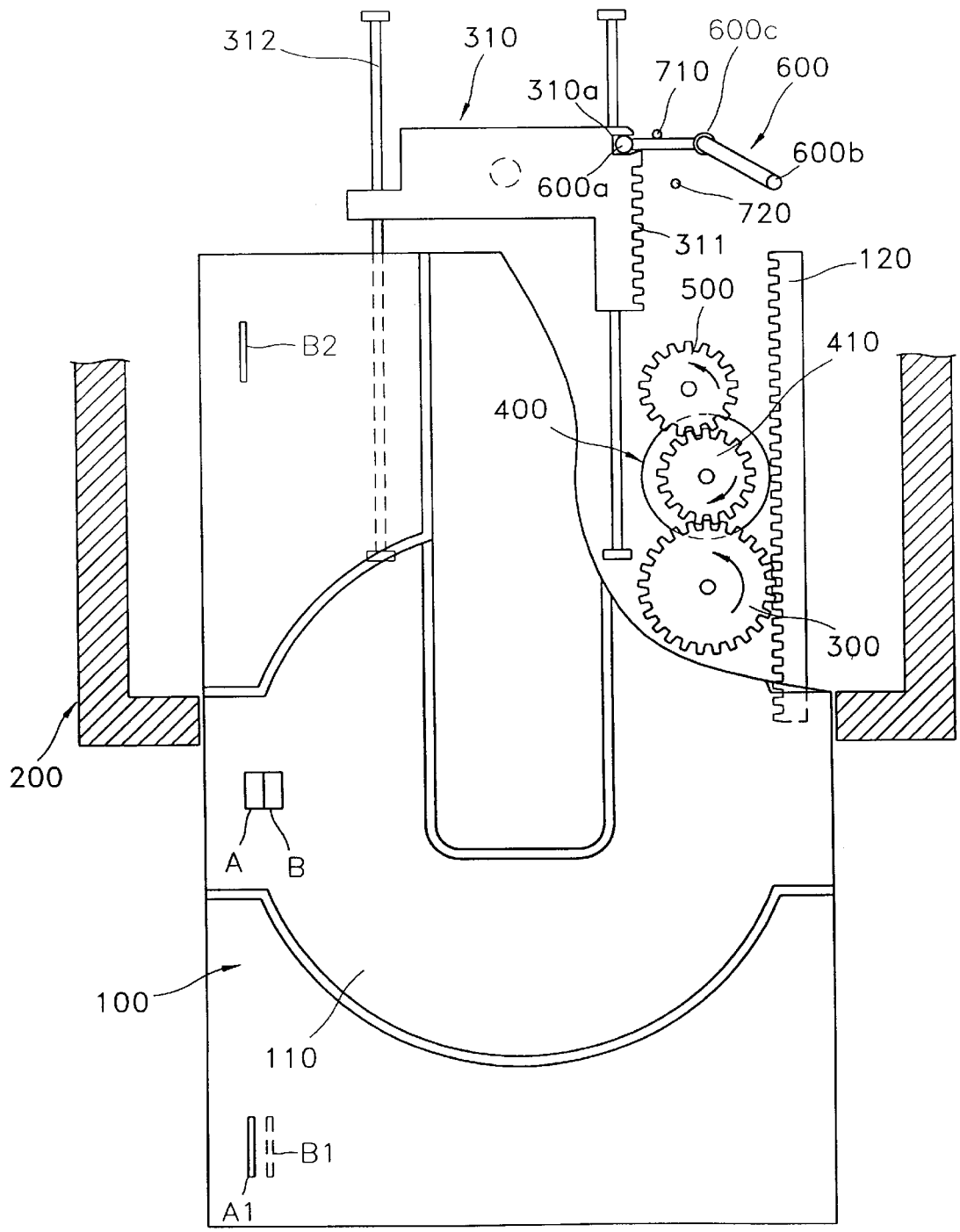
FIG. 4 is a plan view showing a main portion of a combining unit of FIG. 1.
Figure 5:
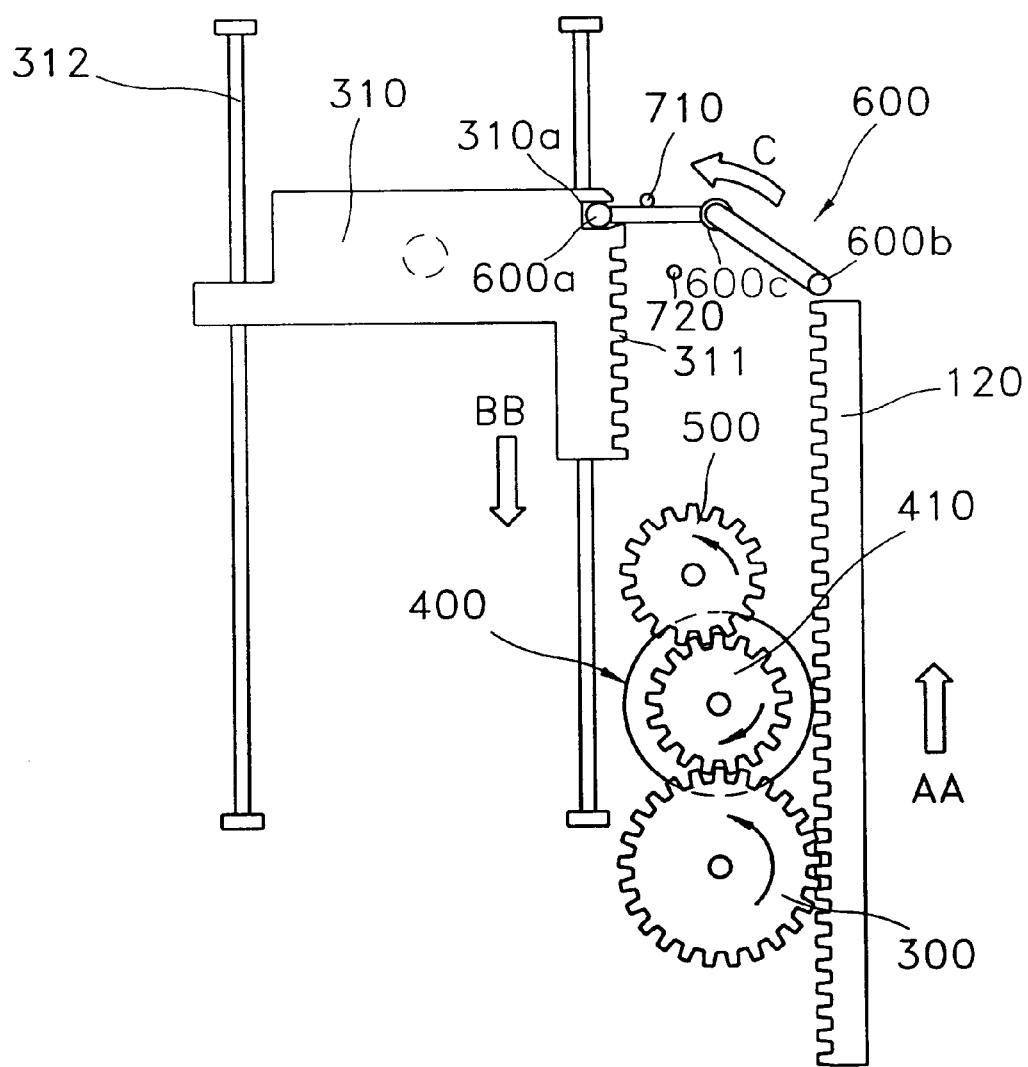
FIGS. 5 and 6 are plan views of the main portion of the combining unit of FIG. 4 when the disk tray is being loaded.

A loading apparatus including the combining unit 15 shown in FIG. 1 is comprised of a disk tray 100 and a pickup 310 as shown in FIGS. 4 and 5. The disk tray 100 is installed to be loaded into and ejected from a housing 200. The pickup 310 is installed in the housing 200 so as to move in and out along a guide rail 312, to read information from a disk (not shown). A loading portion 110 in which the disk is loaded is provided on top of the disk tray 100. A first rack 120 for receiving power from a power source is provided on the bottom of the disk tray 100. Also, a second rack 311 for transmitting power is provided in the side surface of the pickup 311. A loading motor 400, for generating power as a driving source, and a motor gear 410 which rotates, installed on the shaft of the loading motor 400, are provided on one side of the inside of the housing 200.

Also, a loading gear 300 which engages with the first rack 120, and a pickup transfer gear 500 which selectively engages with the second rack 311 as the pickup 310 is moved, are installed to mesh with the motor gear 410. Reference numeral 600 denotes a rotating lever. A first protrusion 600a is formed in one end of the rotating lever, and fits into a receiver 310a provided in one side of the pickup 310. A second protrusion 600b is formed in the other end of the rotating lever and contacts the front end of the rotating lever when the first rack 120 slides. Namely, when the first rack 120 pushes the second protrusion 600b, the rotating lever 600 rotates and transfers the pickup 310 to the pickup transfer gear 500. Also, the rotation range of the rotating lever 600 is limited by a pair of stoppers 710 and 720. This is to prevent the rotating lever 600 from drifting away from the position where the rotating lever 600 contacts the first rack 120.

The operation of the constructing members shown in FIG. 1 will be described as follows.

The key input unit 11 senses a key input provided by a user and transfers it to the controller 12. The key input unit 11 can be implemented by a key panel in front of a disk drive or a remote controller. In particular, in the present invention, the key input unit 11 includes an eject key for inputting an eject command for performing the loading or unloading of the disk tray.

The disk tray position sensor 13 senses the position of the disk tray and outputs combinations of logic values representing the sensed positions of the disk tray. In the present embodiment, the position of the disk tray is represented by one of four modes, i.e., a disk tray open mode, a disk tray move mode, a disk tray down mode, and a loading completion mode, according to the combination of the logic values.

Figure 7:
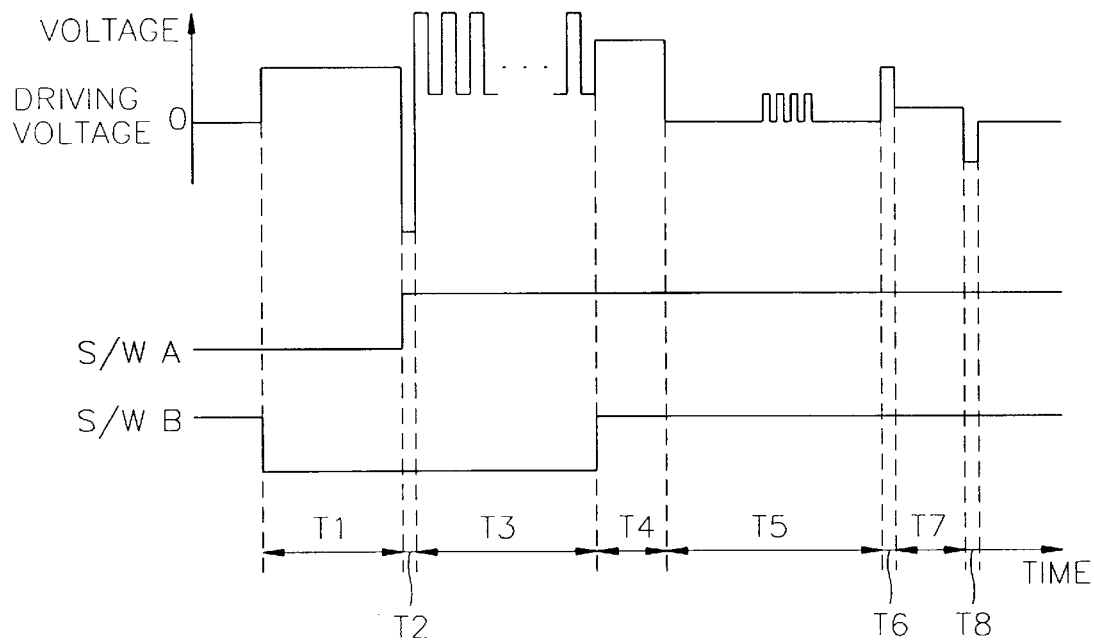
FIG. 7 is a timing chart showing an example of a motor control voltage when the disk tray is being loaded.
Figure 8:
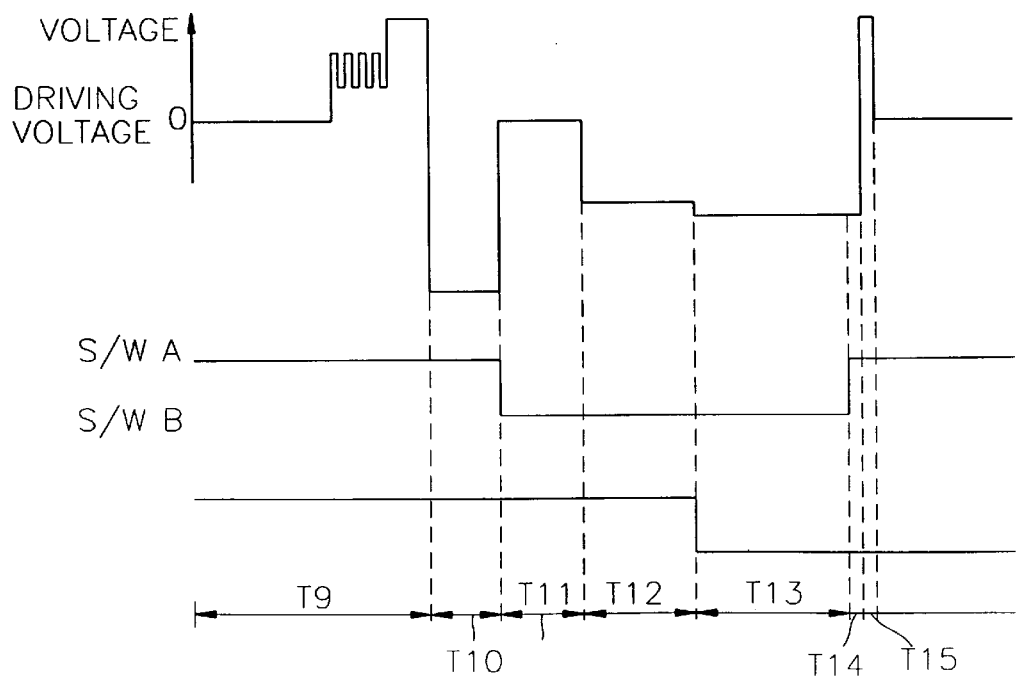
FIG. 8 is a timing chart showing an example of a motor control voltage when the disk tray is being unloaded.

The controller 12 receives the input command and a logic value combination from the key input unit 11 and the disk tray position sensor 13, respectively. When the eject key is input, the controller 12 determines the current position of the disk tray, and generates a motor control signal for instructing the execution of an unloading mode when the disk tray is loaded and a loading mode when the disk tray is ejected. When the disk tray loading mode is to be entered, the motor control signal has a waveform as shown in FIG. 7. When the unloading mode is to be performed, the motor control signal has a waveform as shown in FIG. 8.

The driver 14 includes a motor which receives the motor control signal output by the controller 12 and is driven according to the motor control signal. The motor is indicated by the loading motor 400 shown in FIG. 4, which will be described hereinbelow.

The combining unit 15 transfers a motor power to the loading gear 300 or the pickup transfer gear 500 according to the rotating direction and rotating amount of the motor in the driver.

FIG. 4 shows a main portion of a combining unit of FIG. 1. The combining unit 15 shown in FIG. 4 is similar to the one provided in the above-mentioned related application. The disk tray position sensor 13 is described with reference to FIG. 4.

In the present embodiment, the disk tray position sensor 13 is comprised of electric switches A and B installed in a deck and protrusions A1, B1, and B2 installed in the disk tray as shown in FIG. 4. When the protrusions of the disk tray press the electric switch A or B as the disk tray moves, the pressed switch is turned on. The combinations of the on/off states of the switches A and B are output to the controller 12 as mentioned above. In particular, a protrusion B1 is installed on top of the disk tray in order to sense the vertical movement of the disk tray. Protrusions A1 and B2 are installed on the bottom of the disk tray in order to sense the horizontal movement of the disk tray.

The logic value combination of the electric switches A and B in the respective modes according to the position of the tray is shown in FIG. 2.

The operation of the combining unit 15 of selectively transmitting the power of the motor to the pickup or the disk tray according to the motor control signal from the controller 12 will be described with reference to FIGS. 5 and 6.

First, the power of the motor is transmitted to the disk tray drive according to the loading command so that the disk tray is loaded, and then, is transmitted to the pickup.

When the motor gear 410 is rotated in a clockwise direction by the loading motor 400, the loading gear 300 and the pickup transfer gear 500 engaged with the motor gear 410 rotate in a counter-clockwise direction. The first rack 120 engaged with the loading gear 300 moves in an AA direction. At this time, the pickup transfer gear 500 idles, and the rotating lever 600 and the pickup 310 are stopped while being combined with each other by the first protrusion 600a and the receiver 310a.

When the leading end of the first rack 120 contacts a second protrusion 600b as the first rack 120 continuously moves, the rotating lever 600 rotates in a direction indicated by a reference "C" around a hinge 600C, and moves the pickup 310 fixed by the first protrusion 600a in a direction BB, as shown in FIG. 5.

Figure 6:
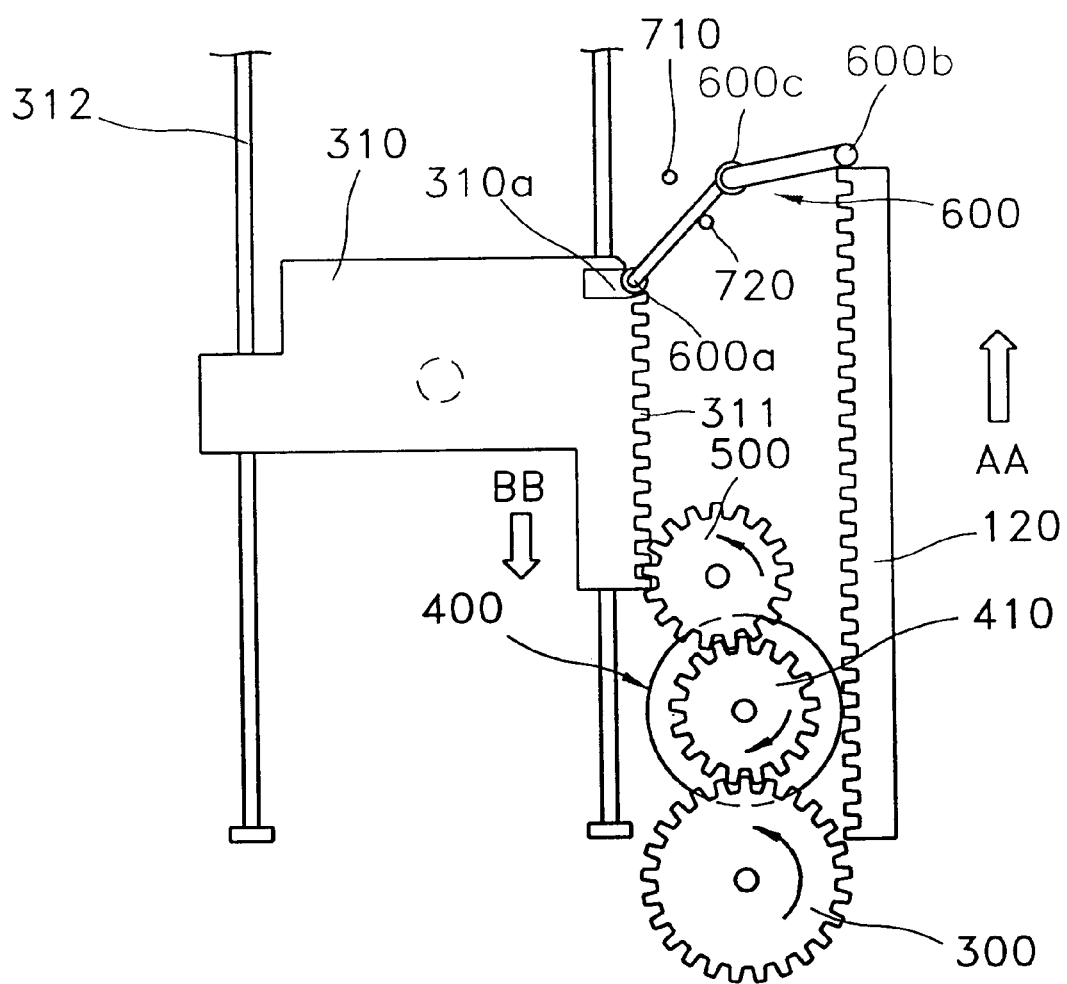

When the above-mentioned operation proceeds, the first rack 120 is separated from the loading gear 300, and the second rack 311 engages with the pickup transfer gear 500, as shown in FIG. 6. Accordingly, the power of the loading motor 400 is transferred to the second rack 311 through the pickup transfer gear 500 and moves only the pickup 310.

Next, a process in which the power of the motor is switched from the pickup to the disk tray according to the unloading command will now be described.

The operation of ejecting the disk tray 100 is performed in the reverse order of the above-mentioned processes through which the loading command is performed. The motor gear 410 rotates in a counter-clockwise direction by the loading motor 400 rotating according to the motor control signal transmitted to the driver 14. The second rack 311 of the pickup is separated from the pickup transfer gear 500, and the first rack 120 engages with the loading gear 300. When the loading motor 400 rotates continuously, the pickup 310 is stopped and only the disk tray 100 is driven. Accordingly, the disk tray 100 is ejected.

To summarize, the combining unit 15 includes the loading gear 300 and the pickup transfer gear 500 which rotate by the loading motor 400, and the rotating lever 600 for transferring the pickup 310 according to the movement of the first rack 120. Accordingly, the movement of the pickup and the loading and unloading of the disk tray can be performed by a single motor.

Figure 3:
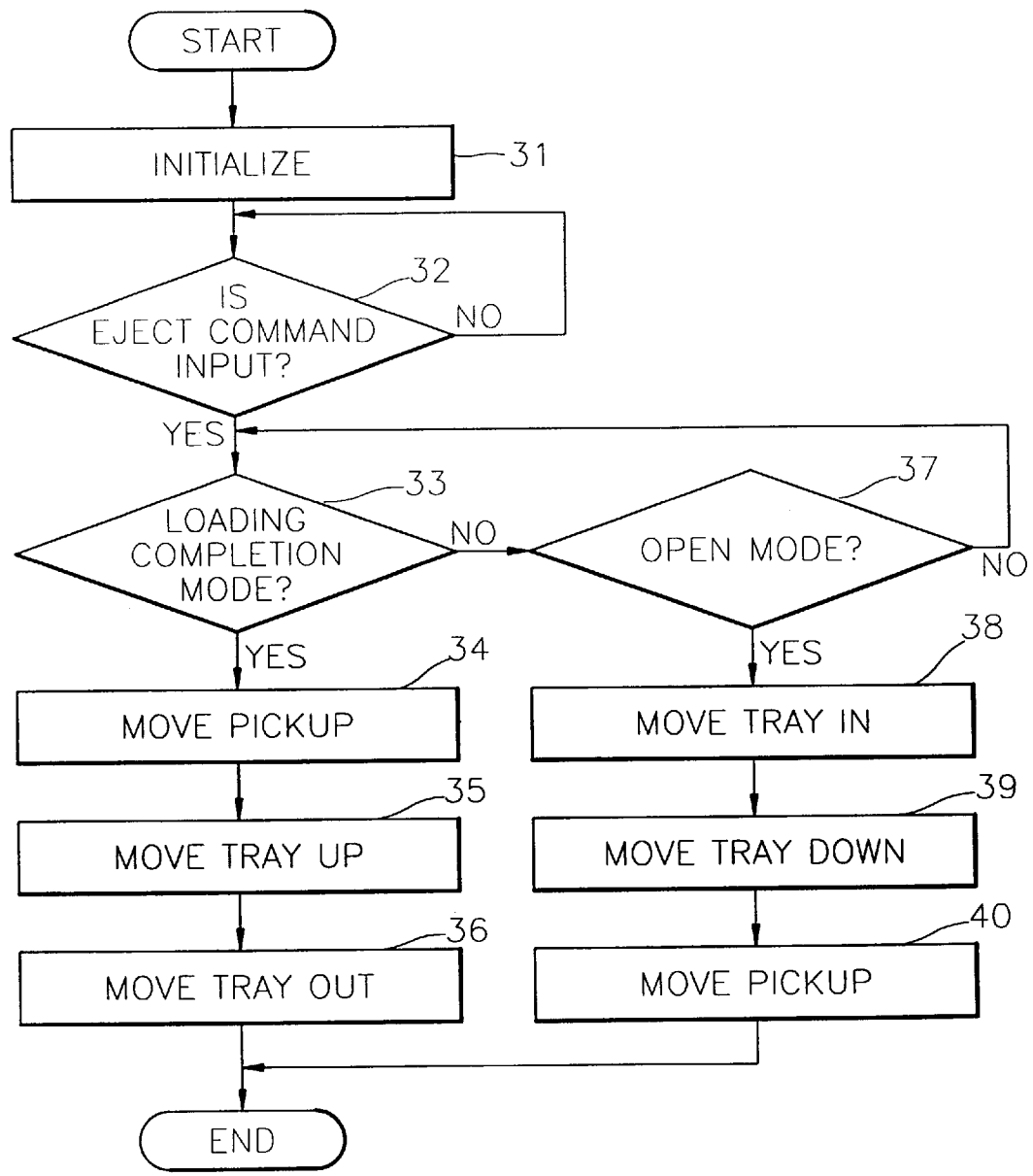
FIG. 3 is a flowchart showing a method of controlling the motion of a disk tray according to the present invention.

A method for controlling the transfer of the disk tray according to the present invention, shown in FIG. 3, will be described with reference to the timing charts shown in FIGS. 7 and 8.

In step 31, the logic value combination according to the switch operations in the respective modes according to the positions of the disk tray as shown in FIG. 2, and the motor control signal for controlling the motor drive voltage corresponding thereto, are determined. Namely, the motor control signal corresponding to the timing charts of FIGS. 7 and 8 is set.

In step 32, it is determined whether the eject command is input. When the eject command is input, it is determined whether the current of the disk tray is currently in the loading completion mode in step 33. The loading completion mode refers to a state in which the electric switches A and B shown in FIG. 4 are turned on and show a logic high state. When the disk tray is determined to be in the loading completion mode, the loaded disk tray is ejected from the deck by the following steps according to the timing chart shown in FIG. 8.

In step 34, the power of the loading motor 400 is transferred to the pickup by the pickup transfer gear 500 in an interval T9, thus moving the pickup to the innermost position on the disk. Then, the pickup is moved to the outer most track by applying a negative voltage during an interval T10 until the switch B is turned off.

In step 35, the disk is completely separated from the rotating plate of a spindle motor by vertically moving the disk tray after a pause of T11. The pause of T11 is to prevent the disk from coming off due to acceleration when the disk is separated from the rotating plate. Then, a negative voltage is applied to the loading motor 400 during an interval T12 in order to start the horizontal movement of the disk tray. When the loading motor 400 inversely rotates in reverse, the second rack 311 of the pickup is separated from the pickup transfer gear 500 and the first rack 120 engages with the loading gear 300, as shown in FIG. 5.

In step 36, the disk tray is ejected in a horizontal direction by applying a negative voltage to the loading motor 400 during an interval T13. At this time, when the loading motor 400 rotates, only the disk tray 100 is ejected while the pickup 310 is stopped. When the unloading of the disk tray is completed, the switch B is pressed by the protrusion B2 of FIG. 4. Accordingly, the switch B is turned on. A negative voltage is applied during an interval T14 in order to confirm the ejection of the disk tray after the switch B is turned on. After the disk is fully ejected, the disk tray is slightly loaded back in by applying a constant voltage during an interval T15 in order to prevent the disk tray from being twisted.

The disk tray is unloaded in response to the eject mode command by switching the power of the motor in order to transfer the pickup or the disk tray using a single motor according to the position of the disk tray, during the above-mentioned steps.

Meanwhile, when the disk tray is determined not to be in the loading completion mode in the step 33, it is determined whether the disk tray is in an open mode in step 37. When the disk tray is not in the open mode, the process returns to the step 33.

When the disk tray is in the open mode, the following loading process is performed according to the timing chart of FIG. 7 in order to load the ejected disk tray in the deck.

In step 38, the motor gear 410 rotates in a clockwise direction by applying a constant voltage to the loading motor 400 during an interval T1 until the switch A is turned on, so that the disk tray 100 begins to move in the AA direction and is loaded into the deck in the horizontal direction. A negative voltage is applied during an interval T2 in order to prevent the disk tray from colliding with the rear of the frame. The disk tray stops moving in the horizontal direction and begins moving in the vertical direction from the timing at which the switch A is turned on.

In step 39, the disk in the disk tray is chucked onto the rotating plate of a spindle motor. Namely, the disk is gradually loaded onto the rotating plate of the spindle motor by supplying the constant voltage at certain intervals during an interval T3.

In step 40, when the motor gear 410 is rotated by the rotation of the loading motor 400 in the clockwise direction during an interval T4, the first rack 120 pushes the second protrusion 600b. Accordingly, the rotating lever 600 rotates and moves the pickup to the pickup transfer gear 500, and the power of the loading motor 400 is transferred to the second rack 31 1 and not to the first rack 120. Accordingly, the power is transferred to the pickup. Therefore, the power of the loading motor 400 is switched from the disk tray motion the pickup motion. Then, the pickup is gradually moved to the innermost position on the disk, by applying pulses of constant voltage to the loading motor 400 during an interval T5. A constant voltage is applied during an interval T6 in order to correctly transfer the pickup to the innermost position on the disk. Then, after a pause of T7, the pickup is moved in the direction of the outer circumference during an interval T8, to reach a TOC track.

Through the above steps, the movement of the pickup and the loading and unloading of the disk tray can be performed by a single loading motor.

As mentioned above, according to the apparatus for controlling the loading of the disk drive and the method therefor according to the present invention, the transfer of the pickup and the loading and unloading of the disk tray can be performed using a single motor. Accordingly, it is possible to save manufacturing costs by reducing the number of parts of the disk drive and to simplify the overall structure.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A disk tray transfer control apparatus, comprising:
    a disk tray;
    a disk tray position sensor comprising at least one switch turned on or off according to a position of the disk tray, for sensing the position of the disk tray and outputting a logic value combination according to the position;
    a controller for generating a motor control signal according to the logic value combination from the disk tray position sensor and an external input command;
    a motor for moving a pickup or the disk tray, according to the motor control signal; and
    a combining means for selectively transmitting motor power to the pickup or the disk tray according to the rotation direction and rotation amount of the motor.

2. The apparatus of claim 1, the disk tray position sensor outputting the logic value combination representing one mode from among a disk tray open mode, a disk tray move mode, a disk tray down mode, and a loading completion mode, according to the position of the disk tray.

3. The apparatus of claim 2, the combining means connecting the motor to the disk tray so that motor power is transmitted to the disk tray when the logic value combination represents the disk tray open mode, the disk tray move mode, or the disk tray down mode, and the motor is transmitted to the pickup when the logic value combination represents the loading completion mode.

4. A disk tray transfer control method of a disk drive for moving a pickup and a disk tray by a single motor, comprising the steps of:
    (a) determining a state mode according to a logic value combination representing a position of the disk tray; and
    (b) transmitting motor power to the disk tray when the logic value combination represents a loading or unloading mode, and transmitting the motor power to the pickup when the logic value combination represents a loading completion mode, according to a disk tray loading/unloading command.

5. The method of claim 4, step (b) comprising the steps of:
    (b1) determining whether the disk tray loading/unloading command has been input;
    (b2) if the disk tray loading/unloading command has been input in step (b1), determining the disk tray loading/unloading command to be an unloading command when a current mode is the loading completion mode and to be a loading command when the current mode is an open completion mode; and
    (b3) moving the tray in accordance with a driving voltage according to a predetermined timing chart while sensing the position of the disk tray.

6. The method of claim 5, upon the command being the unloading command, step (b3) comprising the steps of:
    transferring the pickup to an innermost disk track by transmitting the rotating power of the motor generated by the drive voltage to the pickup, and then switching the power transmission so that the rotating power of the motor is transmitted to the disk tray; and
    moving the disk tray in a reverse direction by the rotating power of the motor generated by the drive voltage to open the disk tray.

7. The method of claim 5, upon the command being the loading command, step (b3) comprising the steps of:
    moving the disk tray in a forward direction by the rotating power of the motor generated by the drive voltage to close the disk tray;
    switching the power transmission so that the rotating power of the motor is transmitted to the pickup after the disk tray is loaded in the deck; and
    moving the pickup to a TOC track by the rotating power of the motor.

8. A disk tray transfer control apparatus of a disk drive for moving a pickup and a disk tray by a single motor, comprising:
    a means for determining a state mode according to a logic value combination representing a position of the disk tray; and
    a means for transmitting motor power to the disk tray when the logic value combination represents a loading or unloading mode, and for transmitting the motor power to the pickup when the logic value combination represents a loading completion mode, according to a disk tray loading/unloading command.

9. The apparatus of claim 8, said means for transmitting comprising:
    a means for determining whether the disk tray loading/unloading command has been input;
    a means for determining the disk tray loading/unloading command to be an unloading command when a current mode is the loading completion mode and to be a loading command when the current mode is an open completion mode if it has been determined that the disk tray loading/unloading command has been input; and
    a means for moving the tray in accordance with a driving voltage according to a predetermined timing chart while sensing the position of the disk tray.

10. The apparatus of claim 9, said means for moving, upon command being the loading command, comprising:
    a means for transferring the pickup to an innermost disk track by transmitting the rotating power of the motor generated by the drive voltage to the pickup, and then switching the power transmission so that the rotating power of the motor is transmitted to the disk tray; and
    a means for moving the disk tray in a reverse direction by the rotating power of the motor generated by the drive voltage to open the disk tray.

11. The apparatus of claim 9, said means for moving, upon the command being the loading command, comprising:
    a means for moving the disk tray in a forward direction by the rotating power of the motor generated by the drive voltage to close the disk tray;
    a means for switching the power transmission so that the rotating power of the motor is transmitted to the pickup after the disk tray is loaded in the deck; and
    a means for moving the pickup to a TOC track by the rotating power of the motor.

* * * * *